(12) United States Patent
Thompson et al.

(10) Patent No.: US 6,220,829 B1
(45) Date of Patent: Apr. 24, 2001

(54) TURBOCHARGER ROTOR WITH LOW-COST BALL BEARING

(76) Inventors: Glenn F. Thompson, 4036 Via Valmonte, Palos Verdes Estates, CA (US) 90274; Robert J. McMullen, 21W553 Lynn Rd., Lombard, IL (US) 60148

( * ) Notice: Subject to any disclaimer, the term of this patent is extended or adjusted under 35 U.S.C. 154(b) by 0 days.

(21) Appl. No.: 09/407,752

(22) Filed: Aug. 28, 1999

Related U.S. Application Data

(60) Provisional application No. 60/103,062, filed on Oct. 5, 1998.

(51) Int. Cl.[7] .................................................. F04B 17/00
(52) U.S. Cl. .......................... 417/407; 384/287; 384/906; 384/99
(58) Field of Search ............................ 417/407; 384/287, 384/906, 99; 184/6.11

(56) References Cited

U.S. PATENT DOCUMENTS

| | | | |
|---|---|---|---|
| 3,043,636 | * | 7/1962 | MacInnes et al. ................... 384/287 |
| 3,811,741 | * | 5/1974 | McInerney et al. ................. 417/407 |
| 4,240,678 | | 12/1980 | Sarle et al. . |
| 4,460,284 | | 7/1984 | Lauterbach et al. . |
| 4,641,977 | | 2/1987 | Woollenweber . |
| 5,076,766 | * | 12/1991 | Gutknecht ............................ 417/407 |
| 5,094,587 | * | 3/1992 | Woollenweber ..................... 417/407 |
| 5,145,334 | * | 9/1992 | Gutknecht ............................ 417/407 |
| 5,870,894 | * | 2/1999 | Woollenweber et al. ............ 417/407 |
| 5,890,881 | * | 4/1999 | Adeff ................................... 417/407 |
| 5,993,173 | * | 11/1999 | Koike et al. ......................... 417/407 |
| 6,032,466 | | 3/2000 | Woollenweber et al. . |
| 6,126,414 | * | 10/2000 | Koike .................................. 417/407 |

FOREIGN PATENT DOCUMENTS 0339601    11/1989  (EP) .

* cited by examiner

*Primary Examiner*—Thomas Denion
*Assistant Examiner*—Thai-Ba Trieu
(74) *Attorney, Agent, or Firm*—Grant Longton; Felix Fischer

(57) ABSTRACT

A combination bearing supporting a shaft interconnecting the turbine and compressor wheels of a turbocharger incorporates a dual film floating journal bearing, a squeeze film damper and ball bearing carrier, and a ball bearing assembly. An angular contact ball bearing with an outer race mounted in the carrier rolls on an inner race mounted against a should on the shaft. The squeeze film damper and ball bearing carrier is pinned to preclude axial or rotational movement. A thrust collar is sandwiched between the ball bearing inner race and the compressor wheel to carry thrust loads.

2 Claims, 2 Drawing Sheets

TURBOCHARGER ROTOR WITH LOW-COST BALL BEARING

CROSS REFERENCE TO RELATED APPLICATIONS

This application claims the priority of copending application Ser. No. 60/103,062 filed on Oct. 5, 1998 having the same title as the present application.

FIELD OF THE INVENTION

This invention relates generally to the field of turbochargers and, more particularly, to a bearing rotor assembly used to support a rotating shaft within a turbocharger.

BACKGROUND OF THE INVENTION

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus, rotation of the turbine also causes the air compressor to spin within a compressor housing of the turbocharger that is separate from the exhaust housing. The spinning of the air compressor causes intake air to enter the compressor housing and be pressurized or boosted a desired amount before it is mixed with fuel and combusted within the engine combustion chamber.

The common shaft extending between the turbine and compressor is disposed through a turbocharger center housing that includes a bearing assembly for: (1) facilitating shaft rotation; (2) controlling axially directed shaft thrust effects and radially directed shaft vibrations; and (3) providing necessary lubrication to the rotating shaft to minimize friction effects and related wear. The common shaft as used in turbocharger applications is known to have shaft-rotating speeds on the order of 60,000 to 80,000 rpm. Under such operating conditions it is imperative that the bearing assembly provide sufficient lubrication to the shaft to minimize the extreme friction effects that take place at such high rotating speeds, thereby extending shaft service life.

Bearing assemblies known in the art for turbocharger shaft applications include roller bearings and ball bearings to accommodate the high-speed shaft rotation. However, it has been found that bearing assemblies that make exclusive use of such ball or roller bearings do not provide a desired service life for turbochargers in vehicle applications. Other bearing assemblies known in the art for turbocharger applications make use of sleeve bearings. However, sleeve bearings have been found to be objectionable in such applications because their design do not tolerate a practical degree of shaft imbalance and do not operate to dampen resonant vibrations caused by such imbalance, such imbalance being a characteristic of rotating turbocharger shafts. Further, the inability of such sleeve bearings to accommodate shaft imbalance at such high speeds is known to cause oil film breakdown and metal-to-metal contact, also reducing the shaft operating life.

In an effort to address the disadvantages of these prior art bearing systems, bearing assemblies have been constructed in the form of a free-floating bushing, positioned between the rotating shaft and a stationary housing cavity, that include a roller or ball bearing system. The use of a roller or ball bearing system in conjunction with the free-floating bushing is designed to both provide a desired degree of lubrication to the shaft and to absorb vibration caused by the shaft during rotating movement at such high speeds. Such bearing systems also employ thrust-bearing surfaces to control axial shaft movement during rotary operation.

For example, U.S. Pat. No. 4,641,977 discloses a bearing system comprising an anti-friction rolling bearing that cooperates with a full-floating sleeve to carry the rotating turbocharger shaft. More specifically, the bearing system comprises an outer race having an integral one-piece elongated cylindrical outer bearing surface that is adapted to be carried rotatably on a film of lubricant at its interface with the turbocharger housing. The outer race cooperates with a full-floating sleeve at one of its ends and with the roller bearing at an opposite end. The roller bearing is interposed between the outer race and an inner race that is positioned concentrically around the shaft diameter. An end of the outer race adjacent the rolling bearing includes outwardly projecting surfaces that form thrust bearings stationary machine element. The shaft rotates within the assembly between the roller bearing and the full-floating sleeve.

While the above-discussed bearing system is known to meet the extreme lubrication and damping demands required in turbocharger shaft applications, its design and construction does not lend itself to cost effective production and assembly. Specifically, in an effort to reduce the costs associated with manufacturing turbochargers it is desired that low-cost components, rather than specially made components, be adapted for use within the turbocharger.

It is, therefore, desirable that a bearing assembly for use in a turbocharger be constructed in a manner that: (1) meets the lubrication requirements of a rotating turbine shaft under operating conditions; (2) provides necessary damping to a vibrating turbine shaft during operation; (3) provides thrust surfaces to control turbine shaft axial movement during rotary operation; and (4) is constructed using one or more low-cost component to reduce turbocharger component costs.

SUMMARY OF THE INVENTION

Turbocharger rotor and low-cost ball bearing assemblies, constructed according to principles of this invention includes: (1) an annular rotating journal bearing disposed concentrically within a stationary turbocharger shaft housing bearing assembly cavity and disposed concentrically around a turbine shaft outside diameter; (2) a cylindrical squeeze film damper disposed within the cavity adjacent an end of the rotating journal bearing and disposed concentrically around the turbine shaft; (3) a thrust (anti rotation) pin disposed within the cavity and connecting with the damper to prevent damper axial and rotational movement within the cavity; and (4) low-cost ball bearings interposed between a ball bearing inner race attached around the turbine shaft, and a ball bearing outer race disposed within a damper end. Bearing assemblies of this invention function to lubricate the turbine shaft under operating conditions, dampen vibrations caused by the rotating turbine shaft, and control axial thrust movement of the turbine shaft during operation without having to use specially designed bearings, through the use of low-cost angular contact ball bearings.

Although bearing assemblies of this invention can be used with any type of high-speed machinery having a shaft that is rotated at high speeds, e.g., 60,000 to 80,000 rpm, they are especially well suited for application within turbochargers for use with internal combustion engines. When placed in turbocharger use, the bearing assembly is disposed within a turbocharger shaft housing around a common rotating shaft having one end attached to a turbine that is disposed within a turbocharger turbine housing, and an opposite end attached to a compressor that is disposed within a turbocharger compressor housing.

BRIEF DESCRIPTION OF THE DRAWINGS

The details and features of the present invention will be more clearly understood with respect to the detailed description and the following drawings, wherein.

DETAILED DESCRIPTION OF THE INVENTION

Figure 1:
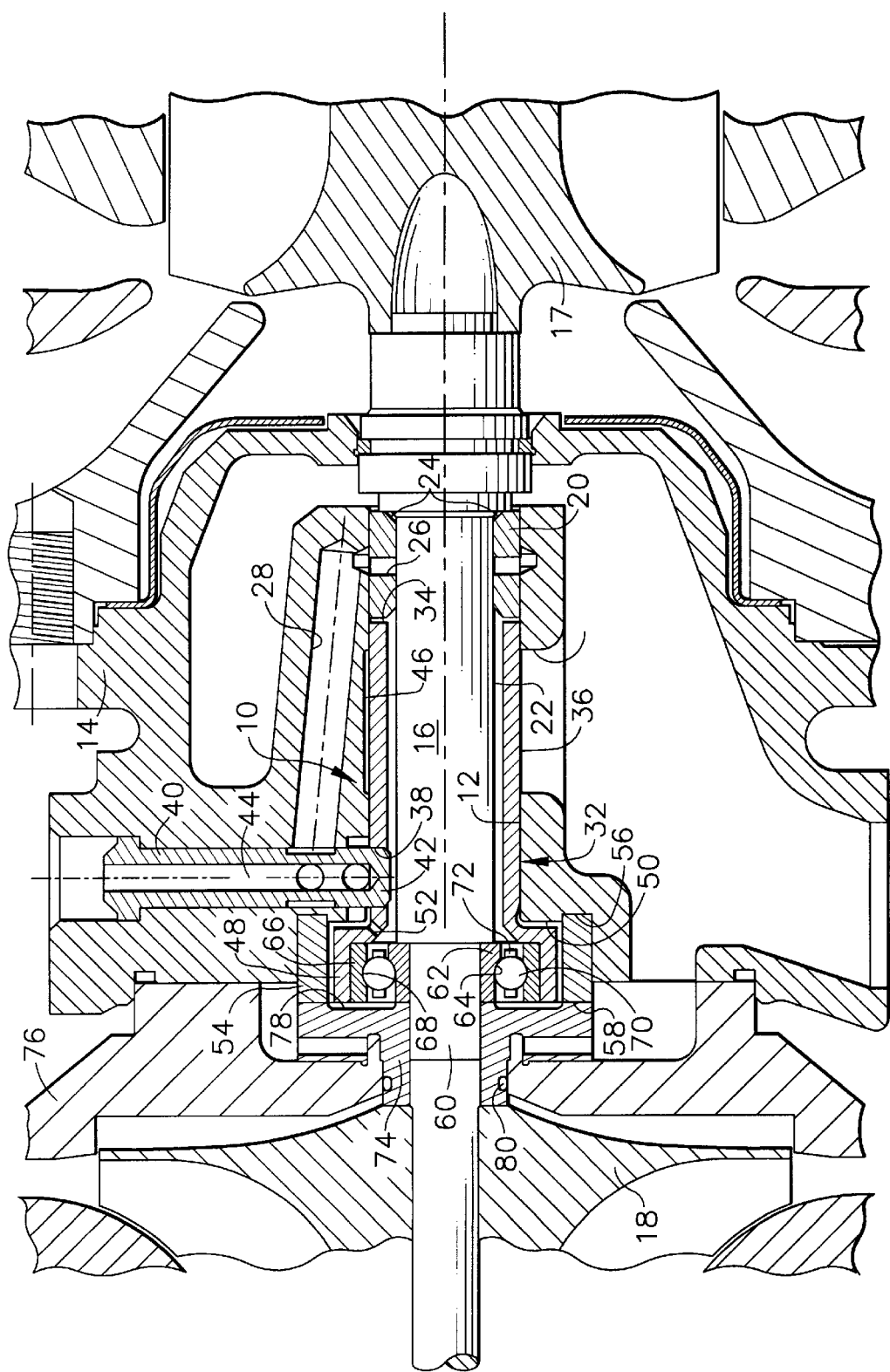
FIG. 1 illustrates a cross-sectional side elevation of a first embodiment turbocharger bearing assembly constructed according to principles of this invention.

Referring now to FIG. 1, a first embodiment turbocharger rotor with low-cost bearing assembly 10 of this invention is disposed within a bearing assembly cavity 12 extending through a stationary turbocharger shaft or center housing 14. A common turbine/compressor shaft 16 is disposed within and extends axially through the cavity 12. A turbine 17 is attached to one end of the shaft 16 illustrated on the right-hand side of FIG. 1, and a compressor 18 is attached to an opposite end of the shaft 16 illustrated on the left-hand side of FIG. 1.

Moving leftwardly from the right-hand side of FIG. 1, the bearing assembly 10 comprises a turbine-side dual film rotating journal bearing 20 disposed concentrically within the cavity 12 and concentrically around an outside shaft diameter 22. The rotating journal bearing 20 can be made from those materials conventionally used in such applications, and is in the form of an annular ring that is disposed within the cavity 12 adjacent the turbine side of the shaft 16. The journal bearing 20 includes axially directed surfaces 24 that taper inwardly moving radially towards the shaft 16 that are designed to minimize the contact surface area between adjacent axial shaft surfaces, thereby minimizing unwanted friction and wear effects between these adjacent surfaces.

The journal bearing 20 also includes one or more lubrication passages 26 that extend radially therethrough from the cavity 12 to the outside shaft diameter 22. The journal bearing lubrication passages 26 are positioned for fluid communication with an oil passageway 28 through the shaft housing 14 to facilitate the transport of lubricating oil to the rotating journal bearing and shaft and, more specifically, between both the adjacent cavity and rotating journal bearing surfaces, and between the adjacent rotating journal bearing and outside shaft diameter surfaces. Lubrication between the rotating journal bearing and cavity is desired, in addition to providing lubrication to the shaft, because the journal bearing is designed to rotate within the cavity. The journal bearing has an outside diameter that is sized to facilitate its rotation within the cavity, and has an inside diameter that is sized to facilitate rotation of the outside shaft diameter therein.

An annular squeeze film damper 32 is disposed concentrically within the cavity 12 and is generally cylindrical in shape. The damper 32 extends axially through the cavity from an end 34 positioned adjacent the journal bearing 20 towards a compressor end of the cavity. The damper 32 includes an axially extending wall 36 having an outside diameter sized to fit within the cavity 12, and has an inside diameter sized larger than the journal bearing inside diameter to facilitate the passage of lubricant between the damper and outside shaft diameter 22 to form a vibration absorbing lubricant film therebetween during shaft rotation. The damper can be formed from materials conventionally used for such applications.

The damper includes a hole 38 that extends radially through a section of the damper wall 36 adjacent the compressor end of the cavity. The hole 38 is provided to accommodate placement of a thrust pin 40 therein. The thrust pin 40 is disposed radially within the shaft housing 14 and includes a terminal end 42 that is positioned within the damper hole 38 to prevent the damper 32 from either moving axially or rotating within the cavity during turbocharger operation and shaft rotation. The thrust pin 40 includes a center passageway 44 that is designed to facilitate the passage of lubricating oil therethrough from the shaft housing and to the damper and outside shaft diameter. The cavity 12 includes an enlarged diameter section 46 that extends circumferentially around the damper wall 36, and that is designed to accommodate a volume of lubricating oil therein for purposes of cooling the damper during shaft rotation.

The damper 32 includes an enlarged diameter section 48 at an end of the damper wall 36 opposite end 24 and adjacent the cavity compressor end. The damper enlarged diameter section 48 extends axially a desired distance towards the compressor and has an inside diameter that is greater than the damper wall 36. The damper enlarged diameter section 48 is designed to accommodate placement of a bearing element outer race therein. The damper enlarged diameter section 48 includes an axially-facing surface that is positioned against a complementary cavity axially-facing surface 50 adjacent to the compressor 18 that is formed by a radially outwardly extending cavity wall section. The damper 32 includes a lubricant passage 52 through a shoulder section of the damper wall 36 formed between the damper wall and the damper enlarged diameter section 48. The lubricant passage 52 is designed to facilitate the passage of lubricating oil from the thrust pin center passageway 44 to the outside shaft diameter 22 and, more specifically, to bearing elements disposed within the cavity as described below. Lubricant flows from the thrust pin center passageway 44, through the lubricant passage 52, and to the rotating shaft 16 and bearing elements during turbocharger operation.

A thrust element 54 fits within a groove 56 in the shaft housing 14, and is positioned concentrically around the damper enlarged diameter section 48. The thrust element 54 is in the form of an annular ring and is designed having an axial end 58 that projects beyond an axial surface of the damper enlarged diameter section 48 to make contact with an adjacent seal gland as better described below.

The shaft 16 includes a reduced diameter section 60 positioned concentrically within the damper enlarged diameter section 48. A ball bearing inner race 62 is disposed concentrically around the shaft reduced diameter section 60, and includes a shoulder 64 along an outside diameter surface that is shaped to accommodate placement of a bearing element, e.g., a ball bearing, inside diameter section thereagainst. The inner race shoulder 64 is designed to transmit shaft thrust directed to the compressor vis-a-vis bearing elements by angular contact therewith. The bearing inner race 62 includes an axial surface that faces in the direction of the turbine and that is positioned against a shoulder formed in the shaft at its transition to the reduced diameter section.

A ball bearing outer race 66 is positioned concentrically within the damper enlarged diameter section 48 and has a groove 68 extending circumferentially along its inside diameter surface to accommodate placement of and limit axial displacement of bearing elements therein. The bearing outer race is shaped generally in the form of an annular ring and is pressed fit into the damper enlarged diameter section 48 so that it remains fixed axially therewith during turbocharger operation. The bearing outer race 66 has a first axial end that is placed against an adjacent axial surface of the damper shoulder, and has a second axial end that is coterminous with a terminal end of the damper enlarged diameter section 48.

A plurality of bearing elements 70, in the form of low-cost ball bearings, are interposed between the bearing inner race 62 and the bearing outer race 68. The bearing elements 70 can be made of conventional materials known in the art for use in such applications, and are arranged together by a single-piece bearing element retainer 72 to form an integral bearing element and retainer assembly. The bearing elements 70 are supported along an inside diameter surface by the shoulder 64 formed along the bearing inner race outside diameter, and along an outside diameter by the groove 68 formed in the bearing outer race inside diameter. Constructed in this manner, rotor thrust transferred by the shaft during turbocharger operation is allowed to be transferred by the ball elements through angular contact of the ball elements by both the bearing inner race and bearing outer race. For example, shaft thrust transmitted from the turbine towards the compressor is transmitted to the bearing elements by angular contact with the inner race, which in turn transmit the thrust to the outer race and damper. The shaft thrust that is transmitted to the damper is absorbed and controlled by the thrust pin, which restricts axial damper and shaft movement.

An annular seal gland 74 is positioned concentrically around a section of the shaft 16 adjacent the bearing inner race 62. The seal gland is interposed axially between a compressor backplate 76 and the shaft housing 14 and is fixed axially therebetween by attachment between the compressor backplate and shaft housing. The seal gland includes an axially-facing surface 78 that is positioned against an axially-facing surface of the thrust element 54 to provide a thrust surface pair. Axial end surfaces of both the damper enlarged diameter section 48 and bearing outer race 66 do not extend axially a sufficient distance to contact the seal gland axially-facing surface 78, thereby not forming thrust surfaces therewith. With this in mind, shaft thrust loads from the compressor are transmitted by the shaft to the seal gland, which is transmitted to the thrust element by its contact with the seal gland the axially-facing surface 78. The thrust element 54 acts to absorb the thrust load by its fixed axial placement within the shaft housing 14. The seal gland 74 includes an annular sealing ring 80, disposed circumferentially around a gland outside diameter, that is interposed between adjacent gland compressor backplate surfaces to form a leak-tight seal therebetween.

A feature of the first embodiment bearing assembly of this invention is the use of low-cost ball bearings to transmit compressor directed thrust loads from the shaft to the damper where they are absorbed without the need for specialty/complex bearings or thrust load assemblies. Specifically, the bearing assembly design enables shaft thrust loads from the turbine to be transmitted from the shaft, via angular contact between the bearing elements and bearing inner and outer races, to the damper where they are absorbed and controlled by the thrust pin. The first embodiment bearing assembly of this invention is also designed to enable shaft thrust loads from the compressor to be transmitted via thrust surfaces between the seal gland and thrust element, interposed between the seal gland and shaft cavity, where they are absorbed and controlled by the thrust element.

Figure 2:
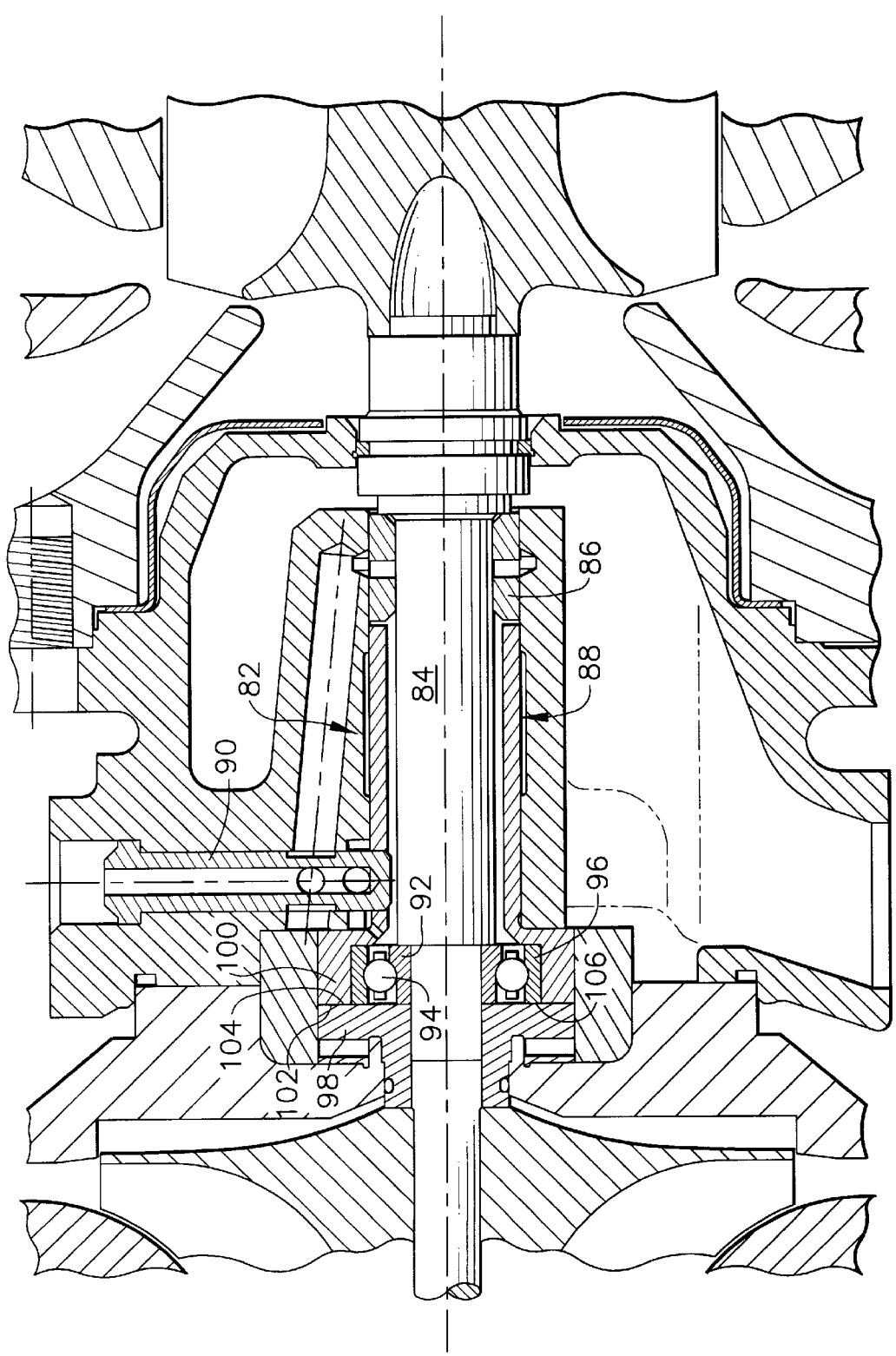
FIG. 2 illustrates a cross-sectional side elevation of a second embodiment turbocharger bearing assembly constructed according to principles of this invention.

FIG. 2, illustrates a second embodiment turbocharger rotor with low-cost bearing assembly 82 of this invention. The second embodiment bearing assembly 82 comprises the following primary components that are identical to those of the first bearing assembly; shaft 84, rotating journal bearing 86, squeeze film damper 88, thrust pin 90, bearing inner race 92, bearing elements 94, and bearing outer race 96. The only difference between the first and second embodiment bearing assemblies lies in construction of the seal gland 98 and the thrust surfaces that are formed between the seal gland and other bearing assembly components to accommodate turbine directed shaft thrust load transmission.

Unlike the first embodiment, the second embodiment bearing assembly 82 comprises a damper enlarged diameter section 100 having an axially-facing end 102 that projects axially a sufficient distance to contact the adjacent seal gland axially-facing surface 104, forming a first thrust load surface pair. The outer bearing race 96 also includes an axially-facing surface 106 that makes contact with the adjacent seal gland axially-facing surface 104, forming a second thrust load surface pair. The design and presence of first and second thrust load surface pairs enables the second embodiment bearing assembly to be constructed without the need for a separate thrust element. Rather, turbine directed shaft thrust loads are transmitted from the seal gland 98, via the first and second thrust load surface pairs, to the damper where they are absorbed and controlled by the thrust pin. Thus, unlike the first embodiment bearing assembly of FIG. 1, that provides the thrust element 54 to absorb turbine directed shaft thrust loads and provides the thrust pin 40 to absorb compressor directed shaft thrust loads, the second embodiment bearing assembly of FIG. 2 provides the thrust pin to absorb and control shaft thrust loads in both axial directions. Other components and features of the second embodiment bearing assembly of this invention are understood to be identical to that described above and illustrated in FIG. 1.

During turbocharger operation, and rotary movement of the shaft, both bearing assembly embodiments of this invention function in the following manner. The rotating journal bearing both directs lubricating oil to the shaft and carries the rotational movement of the shaft adjacent the turbine while rotating to a lessor extent within the cavity. The damper functions to both provide a thin film of lubricating oil between the shaft and damper inside diameter to lubricate the shaft and hydraulically dampen shaft radial vibrations. The damper also functions to route lubricating oil from the shaft housing to the bearing elements. The thrust pin functions to both route lubricating oil to the damper and bearing elements, and prevents the dampener from rotating or being moved axially within the cavity. The bearing outer race, low-cost bearing elements, and bearing inner race enables the use of low-cost ball bearings to transmit compressor directed shaft thrust loads to the damper and thrust pin, where they are absorbed and controlled. In a first bearing assembly embodiment, turbine directed shaft thrust loads are transmitted to and absorbed by a thrust element separated from the damper and interposed between the compressor backplate and shaft housing. In a second bearing assembly embodiment, turbine directed shaft thrust loads are transmitted to the damper and are absorbed by the same thrust pin that is used to absorb and control compressor directed shaft thrust loads.

Having now described the invention in detail as required by the patent statutes, those skilled in the art will recognize modifications and substitutions to the specific embodiments disclosed herein. Such modifications are within the scope and intent of the present invention.

What is claimed is:

1. A turbocharger for internal combustion engines comprising:
   a turbine housing;
   a compressor housing having a compressor backplate attached thereto;
   a shaft housing interposed between the turbine and compressor housing;
   a shaft extending through the shaft housing and comprising a turbine at one end extending into the turbine housing, and a compressor at an opposite shaft end extending into the compressor housing;
   a bearing assembly disposed within a cavity extending through the shaft housing comprising:
     an annular rotating journal bearing positioned concentrically around the shaft adjacent the turbine;
     an annular rotating squeeze film damper positioned concentrically around the shaft and adjacent an axial end of the rotating journal bearing, the damper including an enlarged diameter section at an end opposite the journal bearing;
     a thrust pin disposed radially within the shaft housing and connecting with the damper to prevent the damper from rotating or moving axially within the cavity;
     a bearing outer race disposed concentrically within and connected to the damper enlarged diameter section and having a groove along an inside diameter surface to accommodate placement of a bearing element outside diameter thereagainst;
     a bearing inner race disposed concentrically around a shaft outside diameter and having a shoulder along an outside diameter surface to accommodate placement of a bearing element inside diameter surface thereagainst;
     a plurality of bearing elements interposed between the bearing inner and outer races;
     a thrust element disposed within the shaft housing concentrically around the bearing outer race;
     a seal gland interposed between the shaft housing and compressor backplate, the seal gland having an axially-facing surface in contact with an adjacent axial surface of the thrust element for transmitting a turbine housing directed shaft thrust load to the thrust element;
   wherein compressor housing directed shaft thrust loads are transferred by the bearing elements by angular contact with the bearing inner and outer races to the damper where the thrust loads are absorbed by the thrust pin.

2. A turbocharger for internal combustion engines comprising:
   a turbine housing;
   a compressor housing having a compressor backplate attached thereto;
   a shaft housing interposed between the turbine and compressor housing;
   a shaft extending through the shaft housing and comprising a turbine at one end extending into the turbine housing, and a compressor at an opposite shaft end extending into the compressor housing;
   a bearing assembly disposed within a cavity extending through the shaft housing comprising:
     an annular rotating journal bearing positioned concentrically around the shaft adjacent the turbine;
     an annular rotating squeeze film damper positioned concentrically around the shaft and adjacent an axial end of the rotating journal bearing, the damper including an enlarged diameter section at an end opposite the journal bearing;
     a thrust pin disposed radially within the shaft housing and connecting with the damper to prevent the damper from rotating or moving axially within the cavity;
     a bearing outer race disposed concentrically within and connected to the damper enlarged diameter section and having a groove along an inside diameter surface to accommodate placement of a bearing element outside diameter thereagainst;
     a bearing inner race disposed concentrically around a shaft outside diameter and having a shoulder along an outside diameter surface to accommodate placement of a bearing element inside diameter surface thereagainst;
     a plurality of bearing elements interposed between the bearing inner and outer races;
     a seal gland interposed between the shaft housing and compressor backplate, the seal gland having an axially-facing surface in contact with an adjacent axial surface of the damper, forming a thrust load surface;
   wherein compressor housing directed shaft thrust loads are transferred by the bearing elements by angular contact with the bearing inner and outer races to the damper where the thrust loads are absorbed by the thrust pin;
   wherein turbine housing directed shaft loads are transferred by the seal gland to the damper wherein the thrust loads are absorbed by the thrust pin.

* * * * *